United States Patent [19]
Hsu

[11] Patent Number: 6,062,944
[45] Date of Patent: May 16, 2000

[54] TOY BALL AS TEACHWARE

[76] Inventor: Kevin Hsu, P.O. Box 90, Tainan City, Taiwan

[21] Appl. No.: 09/200,768

[22] Filed: Nov. 30, 1998

[51] Int. Cl.[7] ..................................................... G09B 1/00
[52] U.S. Cl. ........................... 446/901; 434/159; 434/208
[58] Field of Search .............................. 434/322, 81, 138, 434/147, 159, 176, 208, 247; 473/569, 573, 575; 40/327; 446/85, 901

[56] References Cited

U.S. PATENT DOCUMENTS

| | | | |
|---|---|---|---|
| 3,927,881 | 12/1975 | Lemelson | 273/58 K |
| 4,595,367 | 6/1986 | Forsyth | 434/147 |
| 4,660,831 | 4/1987 | Kralik | 273/65 E |
| 4,963,117 | 10/1990 | Gualdoni | 446/219 |
| 5,090,935 | 2/1992 | Monson | 446/101 |
| 5,318,294 | 6/1994 | Boroski | 273/67 R |
| 5,344,155 | 9/1994 | Huang | 273/346 |
| 5,551,687 | 9/1996 | Krull | 273/58 K |

*Primary Examiner*—Robert A. Hafer
*Assistant Examiner*—Kurt Fernstrom

[57] ABSTRACT

A toy ball as teachware includes a rubber ball body, a ball-shaped Velcro layer covering on the ball body, and a plurality of Velcro pieces written with letters, characters, symbols, figures, etc. on the outer surfaces to be stuck releasably on the ball-shaped Velcro layer. Then the toy ball may serve as a toy for children to play and as a teachware to learn from.

2 Claims, 2 Drawing Sheets

TOY BALL AS TEACHWARE

BACKGROUND OF THE INVENTION

This invention relates to a toy ball as teachware, particularly to one provided with a rubber ball body, and a ball-shaped layer covering around the ball body, a plurality of pieces written with letters, characters, symbols, or FIGS. on the outer surfaces. The pieces may be adhered releasably on the layer by Velcro, i.e., a hook and loop fastener structure provided on the layer and pieces, so that the toy ball may be used for playing and teaching as well.

Nowadays children learn very fast from information supplied by many sources, and their intelligence quotients are higher now than before. Many of them begin to learn basic language, mathematics, even a foreign language in kindergarten. And teachers commonly use white boards or pictures in teaching, while children may be active, looking around or restless in their seats to listen to their teachers. So many auxiliary playing things or teachware have to be utilized to attract the children' attention for teaching.

SUMMARY OF THE INVENTION

This invention has an object to offer a toy ball as teachware for children to play with and learn from.

The main feature of the invention is a toy ball having an outer Velcro layer for separate Velcro pieces written with letters, characters, symbols, FIGS., etc. on the outer surfaces to be releasably stuck thereon for learning.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
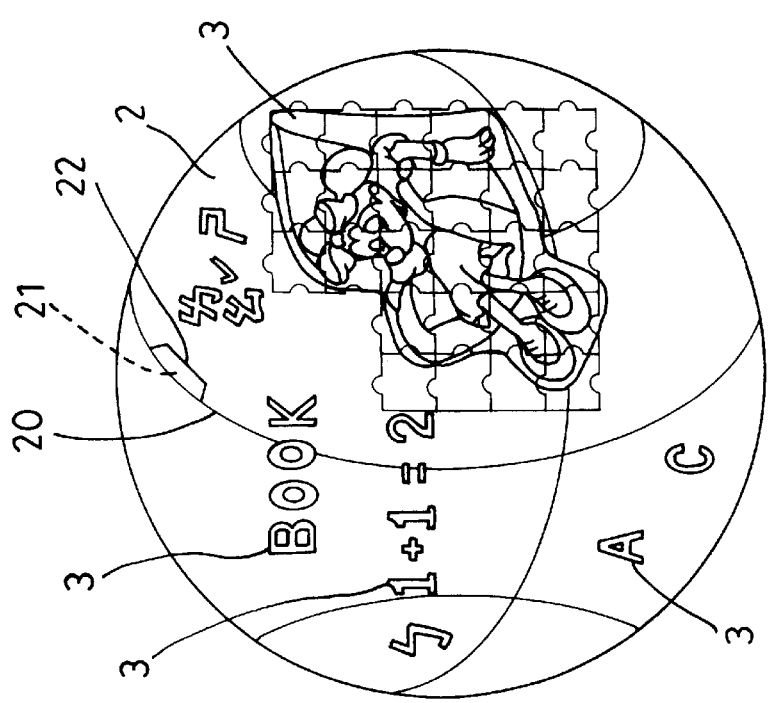
FIG. 1 is a perspective view of a toy ball as teachware in the present invention.

A preferred embodiment of a toy ball as teachware in the present invention, as shown in FIG. 1, includes a rubber ball body 1 with an air valve 10 fixed on an outer surface, a Velcro layer 2, defining a plurality of hooks or loops, on the ball body 1 and having a plurality of lines 20 (as those on a basket ball, a foot ball, a baseball etc.) formed in the Velcro layer 2, an aperture 21 formed in the Velcro layer 2 for the deflated ball body 1 to pass through, a cap 22 having a corresponding Velcro patch on its inner side to stick and close on the aperture 21 of the Velcro layer 2, a plurality of Velcro pieces 3, each having a corresponding loop or hook structure for releasably engaging, respectively, the hooks or loops of the layer 2, are written with indicia, such as letters, characters, symbols, FIGS., etc. on the outer surfaces to be stuck releasably on the Velcro layer 2.

Figure 2:
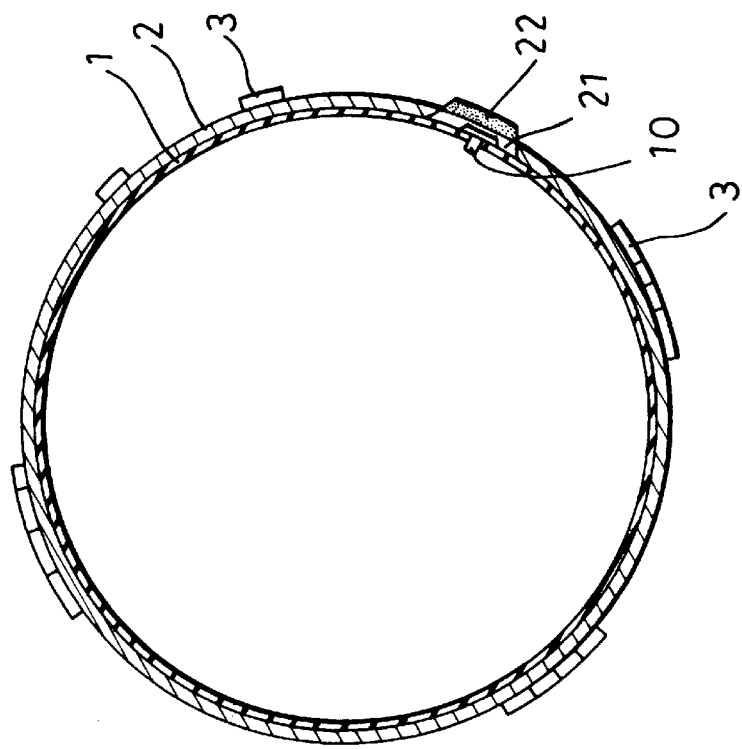
FIG. 2 is a cross-sectional view of the toy ball as teachware in the present invention; and, FIG. 3 is a perspective view of the toy ball of the present invention being played by a child in the present invention.
Figure 3:
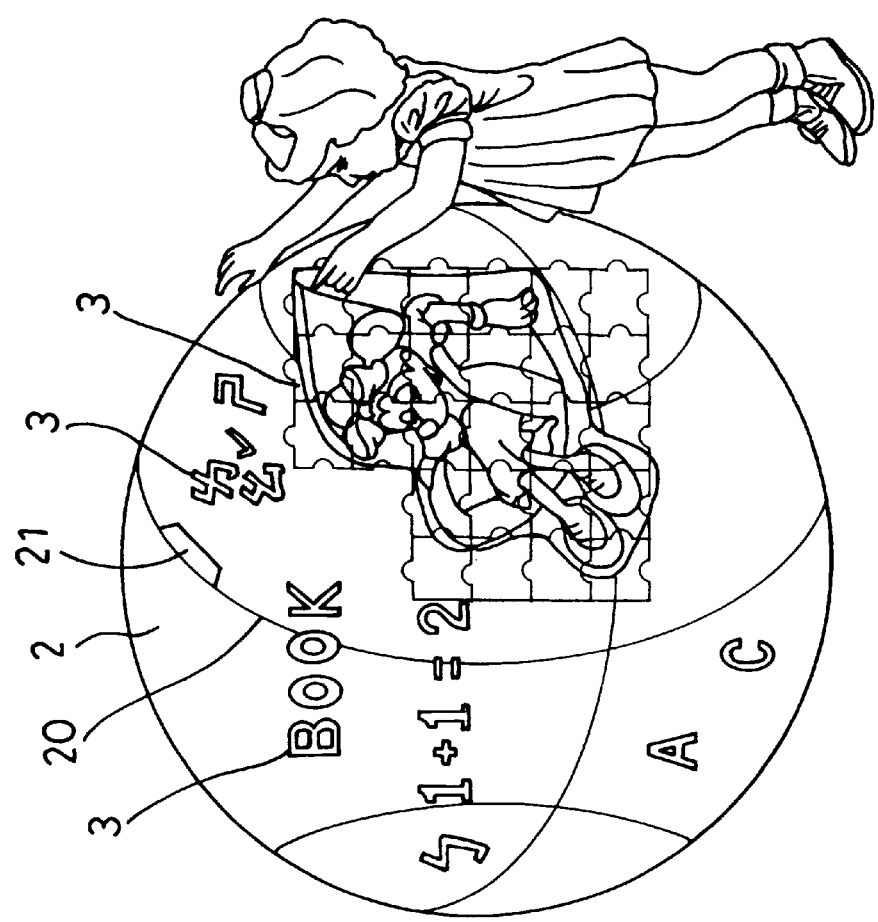

In using, referring to FIGS. 1, 2 and 3, firstly, the deflated rubber ball body 1 deflated is inserted in the Velcro layer 2 through the aperture 21, and then the ball body 1 is inflated with air through the air valve 10 to an inflated saturated-condition. Next, the air valve 10 is pushed in to the ball body 1 and, with the cap 22 is closed on the aperture 21. Then the ball can be played by hitting the ball body 1 with a palm on the ground, rolling, kicking, throwing, etc. If the ball is to be used as teachware, children may gather around the ball, and are taught to select a Velcro piece with a special letter, character, symbol or FIG. and to stick it on the Velcro layer 2 of the ball so as to learn the letter and so on. Thus children can learn and play with the ball at the same time.

As can be seen from the above description, the toy ball in the invention has the following advantages:

1. Its structure is very simple and easy to use.
2. The Velcro layer of the ball is very soft, extremely safe to play with and cannot harm children, even when hit hard by the ball.
3. It serves children in playing and learning at the same time.
4. It can be used as a globe, with world maps adhered on the outer layer.
5. It can be used as advertisement, with advertising words adhered on the outer layer.

While the preferred embodiment of the invention has been described above, it will be recognized and understood that various modifications may be made therein and the appended claims are intended to cover all such modifications which may fall within the spirit and scope of the invention.

What is claimed is:

1. A toy ball as teachware comprising:
   a) an inflatable rubber ball body;
   b) a hollow ball-shaped outer layer having an exterior surface and an interior space corresponding in size to the ball body in its inflated state, the outer layer including an aperture through which the ball body in its deflated state may be inserted and thereafter inflated, and a cover for closing the aperture;
   c) a plurality of pieces, each piece having an outer surface and an inner surface, each outer surface being provided with indicia thereon; and
   d) substantially the entire exterior surface of the outer layer having a first component of a cooperating hook and loop fastening assembly and each inner surface of each piece having a second component of the hook and loop fastening assembly for permitting the pieces to be detachably secured to the outer layer by children for playing and learning purposes.

2. The toy ball of claim 1 wherein the outer layer is formed from a plurality of sheets sewn together to form lines for simulating the appearance of a sport ball.

* * * * *